US009847077B1

(12) United States Patent
Laprad

(10) Patent No.: US 9,847,077 B1
(45) Date of Patent: Dec. 19, 2017

(54) GUITAR PICK RETRIEVAL TOOL

(71) Applicant: Erin Laprad, Milford, MA (US)

(72) Inventor: Erin Laprad, Milford, MA (US)

( * ) Notice: Subject to any disclaimer, the term of this patent is extended or adjusted under 35 U.S.C. 154(b) by 0 days.

(21) Appl. No.: 15/376,806

(22) Filed: Dec. 13, 2016

(51) Int. Cl.
*G10G 7/00* (2006.01)
*B25J 1/02* (2006.01)
*B25J 15/00* (2006.01)

(52) U.S. Cl.
CPC .................. *G10G 7/00* (2013.01); *B25J 1/02* (2013.01); *B25J 15/008* (2013.01)

(58) Field of Classification Search
CPC .. B25J 1/02; B25J 15/008; G10D 3/08; G10D 3/163
See application file for complete search history.

(56) References Cited

U.S. PATENT DOCUMENTS

| | | | |
|---|---|---|---|
| 4,073,530 A | 2/1978 | Seidler | |
| 4,653,789 A | 3/1987 | McWilliams | |
| 4,953,902 A | 9/1990 | Brown | |
| 5,251,943 A | 10/1993 | Dalbo | |
| 6,220,250 B1 | 4/2001 | Park | |
| 8,240,731 B2 | 8/2012 | Roszak | |
| 9,016,739 B2 | 4/2015 | Mondano | |
| 2003/0173788 A1 | 9/2003 | Fussell | |
| 2015/0075352 A1* | 3/2015 | McDonald | G10D 3/163 84/322 |

FOREIGN PATENT DOCUMENTS

| | | | |
|---|---|---|---|
| JP | 20132786 U * | 12/1986 | A47L 25/00 |
| WO | WO2008124905 A1 * | 10/2008 | B08B 7/0028 |

* cited by examiner

*Primary Examiner* — Kimberly Lockett
(74) *Attorney, Agent, or Firm* — Kyle A. Fletcher, Esq.

(57) ABSTRACT

The guitar pick retrieval tool is a hand tool that is configured to retrieve a pick that has fallen into the sound hole of a guitar. The guitar pick retrieval tool comprises an adhesive tip, a flexible shaft, and a handle. The handle is attached to an end of the flexible shaft. The adhesive tip is attached to the end of the flexible shaft that is distal from the handle. The flexible shaft is a semi-rigid shaft. The flexible shaft does not behave in an elastic manner. The semi-rigid nature of the flexible shaft allows the shaft to be bent into an arbitrary but stationary position which will be maintained until the flexible shaft is subsequently manipulated. The adhesive tip captures the pick by adhering to the pick when the adhesive tip is placed against the pick.

19 Claims, 3 Drawing Sheets

GUITAR PICK RETRIEVAL TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools for shaping and manipulating, more specifically, an articulated hand tool configured for use in retrieving an object.

SUMMARY OF INVENTION

The guitar pick retrieval tool is a hand tool that is configured to retrieve a pick that has fallen into the sound hole of a guitar. The guitar pick retrieval tool comprises an adhesive tip, a flexible shaft, and a handle. The handle is attached to an end of the flexible shaft. The adhesive tip is attached to the end of the flexible shaft that is distal from the handle. The flexible shaft is a semi-rigid shaft. The flexible shaft does not behave in an elastic manner. The semi-rigid nature of the flexible shaft allows the shaft to be bent into an arbitrary but stationary position which will be maintained until the flexible shaft is subsequently manipulated. The adhesive tip captures the pick by adhering to the pick when the adhesive tip is placed against the pick.

These together with additional objects, features and advantages of the guitar pick retrieval tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the guitar pick retrieval tool in detail, it is to be understood that the guitar pick retrieval tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the guitar pick retrieval tool.

It is therefore important that the claims be regarded as including such equivalent construction insofar as they do not depart from the spirit and scope of the guitar pick retrieval tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
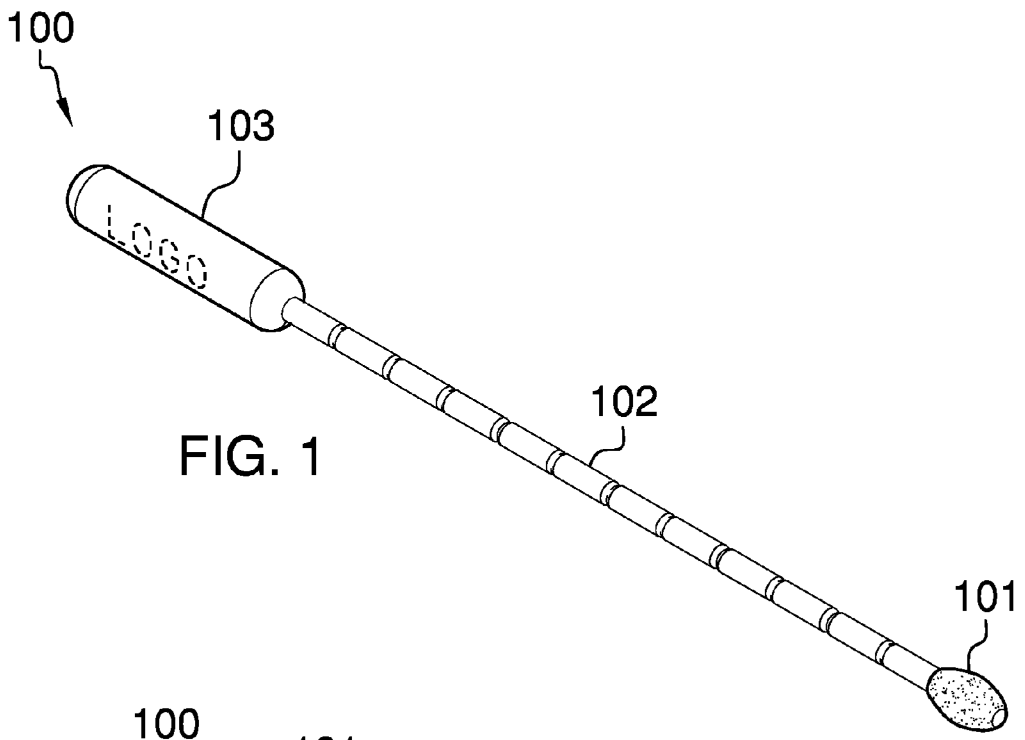
FIG. 1 is a first perspective view of an embodiment of the disclosure.
Figure 2:
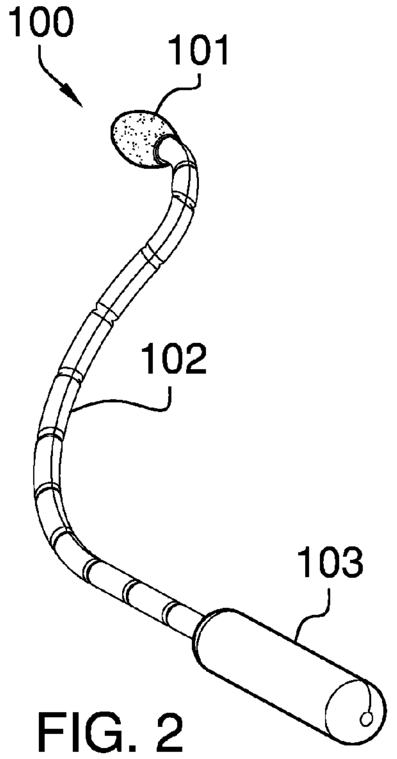
FIG. 2 is a second perspective of an embodiment of the disclosure.
Figure 3:
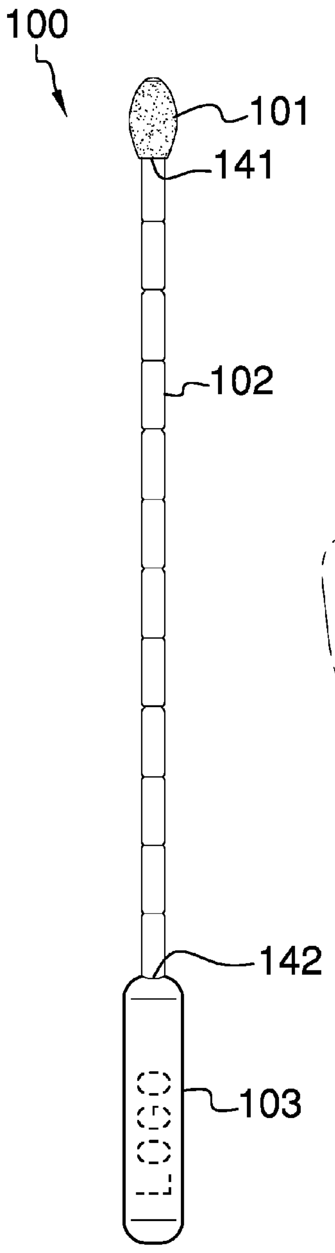
FIG. 3 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The guitar pick retrieval tool 100 (hereinafter invention) is a hand tool that is configured to retrieve a pick 162 that has fallen into the sound hole 163 of a guitar 161. The pick 162 is a small thin and handheld structure that is used to pluck the strings of stringed instruments. Picks 162 are well known among those skilled in the musical arts. The guitar 161 is further defined with a sound hole 163 and a plurality of strings 164. The sound hole 163 comprises one or more holes formed within the sound board of the guitar 161. The sound hole 163 allows the sound to escape from the body of the guitar 161 such that the sound can be heard. The plurality of strings 164 comprises a collection of 6, or occasionally 12, strings that are attached to the guitar 161 under tension. The vibration of the plurality of strings 164 generate the audible vibrations from the guitar 161 that are interpreted as music. The invention 100 comprises an adhesive tip 101, a flexible shaft 102, and a handle 103. The handle 103 is attached to an end of the flexible shaft 102. The adhesive tip 101 is attached to the end of the flexible shaft 102 that is distal from the handle 103. The adhesive tip 101 captures the pick 162 by adhering to the pick 162 when the adhesive tip 101 is placed against the pick 162.

The flexible shaft 102 is a semi-rigid shaft. The flexible shaft 102 does not behave in an elastic manner. The semi-rigid nature of the flexible shaft 102 allows the flexible shaft 102 to be bent into an arbitrary but stationary position which will be maintained until the flexible shaft 102 is subsequently manipulated. The flexible shaft 102 comprises a wire core 111 and a flexible covering 112. The flexible shaft 102 is further defined with a first end 141 and a second end 142. The flexible shaft 102 is a cylindrical structure that is further defined with an outer diameter. In the first potential embodiment of the disclosure, the flexible shaft 102 is a readily and commercially available product that is commonly referred to as a reusable rubber twist tie.

The wire core 111 is a metal wire. The wire core 111 is formed in a semi-rigid but non-elastic fashion such that the wire core 111 can be bent into an arbitrary position that will be maintained until the wire core 111 is subsequently adjusted. The wire core 111 provides the structural stability of the flexible shaft 102. The flexible covering 112 is a covering that is formed from an elastic material that is used to coat the wire core 111. Suitable materials for use as the flexible covering 112 include, but are not limited to, latex or polyurethane. The flexible covering 112 is used to protect the guitar 161 from the damage that may be caused by the rubbing of the wire core 111 against the guitar 161 during the use of the invention 100.

The handle 103 is a readily and commercially available device that provides a grip for use in manipulating the invention 100. In the first potential embodiment of the disclosure, the handle 103 is a readily and commercially available capped tube 121. The capped tube 121 is further defined with an open end 122 and a capped end 123. The open end 122 forms a cylindrical aperture that is further defined with an inner diameter. The open end 122 of the capped tube 121 is an aperture that provides access to the interior of the capped tube 121. The capped end 123 of the capped tube 121 is the closed end of the capped tube 121.

The adhesive tip 101 is an adhesive structure that is attached to the flexible shaft 102. The adhesive tip 101 is formed with a removable adhesive such that the pick 162 can be readily removed from the adhesive tip 101 after retrieval. The adhesive tip 101 comprises a readily and commercially available reusable adhesive putty 131. In the first potential embodiment of the disclosure, the reusable adhesive putty 131 is a readily and commercially available adhesive product that is has a dough like malleable consistency that will self-adhere to the first end 141 of the flexible shaft 102 such that the adhesive tip 101 can be replace as required.

The assembly of the first potential embodiment of the disclosure is described in this paragraph. The outer diameter of the second end 142 of the flexible shaft 102 is lesser than the inner diameter of the open end 122 of the capped tube 121 such that the second end 142 of the flexible shaft 102 will fit into the open end 122 of the capped tube 121. The adhesive tip 101 attaches to the first end 141 of the flexible shaft 102. The second end 142 of the flexible shaft 102 is inserted into the open end 122 of the capped tube 121.

Figure 4:
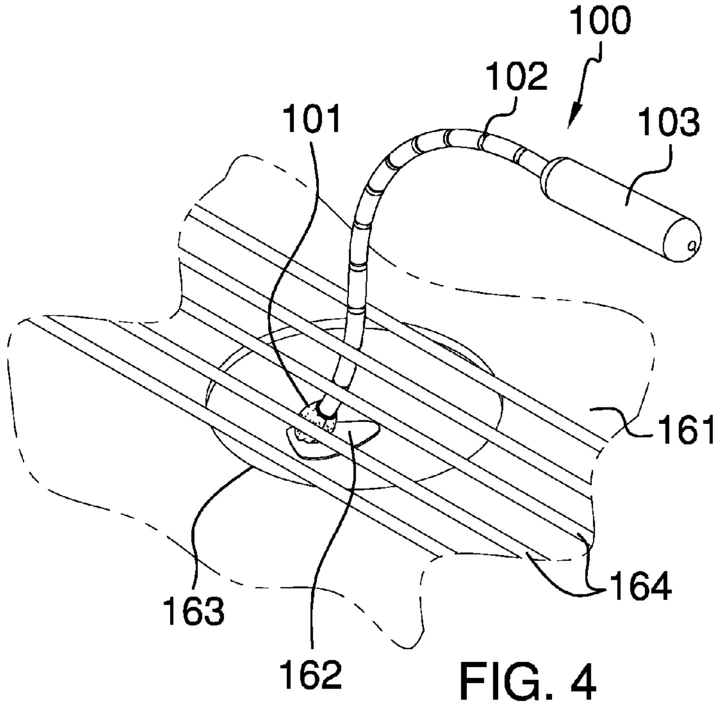
FIG. 4 is an in use view of an embodiment of the disclosure.
Figure 5:
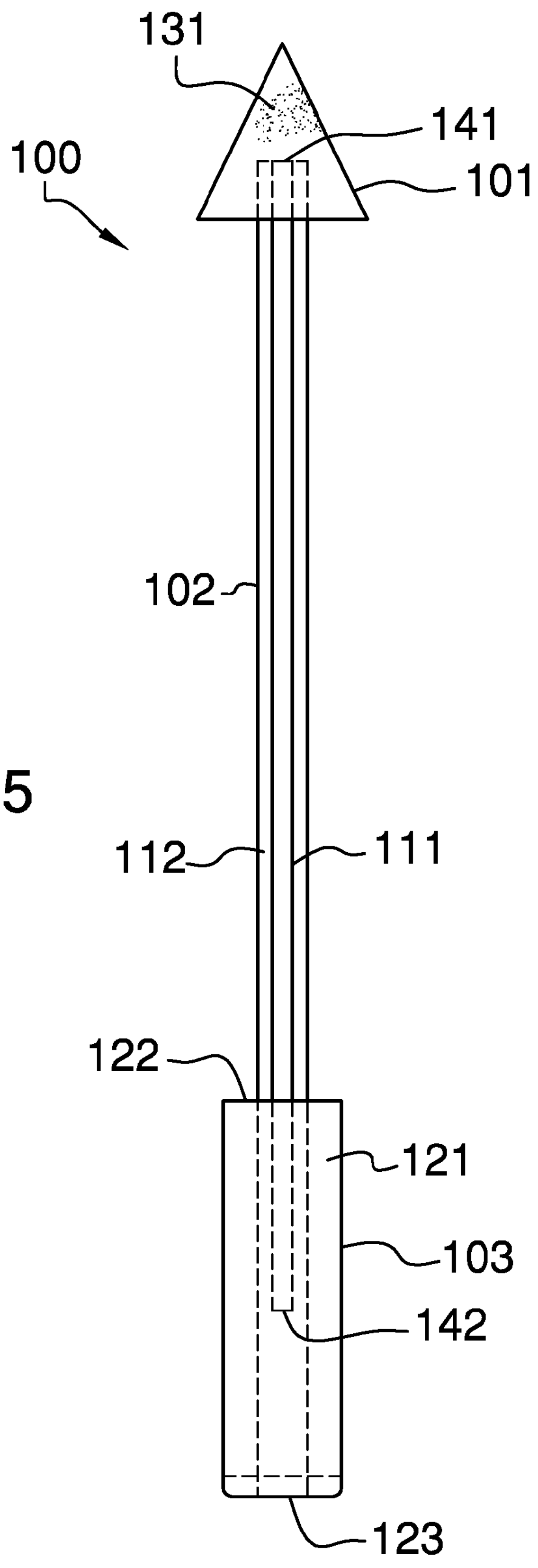
FIG. 5 is a detail view of an embodiment of the disclosure.

The first potential embodiment of the disclosure, as shown in FIG. 4, is used as described in this paragraph. The flexible shaft 102 is bent into a position that allows for the flexible shaft 102 to be inserted through the plurality of strings 164 of the guitar 161 into the sound hole 163. The flexible shaft 102 is manipulated using the handle 103 such that the adhesive tip 101 is placed against the pick 162. The pick 162 is thus adhered to the adhesive tip 101. The pick 162 can then be removed through the sound hole 163 and thereinafter retrieved.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Removable Adhesive: As used in this disclosure, a removable adhesive is an commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Elastic: As used in this disclosure, an elastic is a material or object that deforms when a force is applied to it and that is able to return to its original shape after the force is removed. A material that exhibits these qualities is also referred to as an elastomeric material.

Guitar: As used in this disclosure, a guitar is a stringed musical instrument generally having a flat back, a neck, a fretted fingerboard, and either 6 or 12 strings, and a sound hole. A guitar is played by strumming or plucking with the fingers or a pick. A guitar can be acoustically or electrically amplified. This definition is intended to match the common usage of the term.

Handle: As used in this disclosure, a handle is an object by which a tool, object, or door is held or manipulated with the hand.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A semi-rigid retrieval device configured for use with a guitar comprising:

an adhesive tip, a flexible shaft, and a handle;

wherein the handle is attached to an end of the flexible shaft;

wherein the adhesive tip is attached to the end of the flexible shaft that is distal from the handle;

wherein the semi-rigid retrieval device configured for use with a guitar is configured for use with a guitar;

wherein the guitar is further defined with a sound hole and a plurality of strings;

wherein the sound hole comprises one or more holes formed within the guitar;

wherein the plurality of strings comprises a collection of strings that are attached to the guitar under tension;

wherein the number of strings contained within the plurality of strings is selected from a group consisting of six or twelve;

wherein the semi-rigid retrieval device configured for use with a guitar is a hand tool that is configured to retrieve a pick that has fallen into the sound hole of a guitar;

wherein the pick is a handheld structure that plucks the strings of the guitar;

wherein the adhesive tip captures the pick.

2. The semi-rigid retrieval device configured for use with a guitar according to claim 1 wherein the flexible shaft is a semi-rigid shaft;

wherein the flexible shaft does not behave in an elastic manner;

wherein the flexible shaft is bent into an arbitrary but stationary position;

wherein the arbitrary but stationary position is maintained until the flexible shaft is subsequently manipulated.

3. The semi-rigid retrieval device configured for use with a guitar according to claim 2 wherein the flexible shaft comprises a wire core and a flexible covering;

wherein the flexible covering encloses the wire core;

wherein the flexible shaft is further defined with a first end and a second end;

wherein the flexible shaft is a cylindrical structure that is further defined with an outer diameter.

4. The semi-rigid retrieval device configured for use with a guitar according to claim 3 wherein the flexible covering protects the guitar from a damage.

5. The semi-rigid retrieval device configured for use with a guitar according to claim 4 wherein the wire core is a metal wire.

6. The semi-rigid retrieval device configured for use with a guitar according to claim 5 wherein the wire core is formed in a semi-rigid but non-elastic fashion such that the wire core can be bent into an arbitrary position that will be maintained until the wire core is subsequently adjusted.

7. The semi-rigid retrieval device configured for use with a guitar according to claim 6 wherein the flexible covering is formed from an elastic material.

8. The semi-rigid retrieval device configured for use with a guitar according to claim 7 wherein the handle provides a grip for use in manipulating the semi-rigid retrieval device configured for use with a guitar.

9. The semi-rigid retrieval device configured for use with a guitar according to claim 8 wherein the handle is a capped tube;

wherein the capped tube is further defined with an open end and a capped end;

wherein the open end forms a cylindrical aperture that is further defined with an inner diameter;

wherein the open end of the capped tube is an aperture that provides access to the interior of the capped tube;

wherein the capped end of the capped tube is the closed end of the capped tube.

10. The semi-rigid retrieval device configured for use with a guitar according to claim 9 wherein the adhesive tip is an adhesive structure that attaches to the flexible shaft.

11. The semi-rigid retrieval device configured for use with a guitar according to claim 10 wherein the adhesive tip is formed with a removable adhesive.

12. The semi-rigid retrieval device configured for use with a guitar according to claim 11 wherein the adhesive tip comprises a reusable adhesive putty;

wherein the reusable adhesive putty has a malleable consistency.

13. The semi-rigid retrieval device configured for use with a guitar according to claim 12 wherein the adhesive tip self-adheres to the flexible shaft.

14. The semi-rigid retrieval device configured for use with a guitar according to claim 13 wherein the outer diameter of the second end of the flexible shaft is lesser than the inner diameter of the open end of the capped tube.

15. The semi-rigid retrieval device configured for use with a guitar according to claim 14 wherein the adhesive tip attaches to the first end of the flexible shaft;

wherein the second end of the flexible shaft is inserted into the open end of the capped tube.

16. The semi-rigid retrieval device configured for use with a guitar according to claim 15 wherein the flexible shaft inserted into the sound hole;

wherein the flexible shaft is manipulated using the handle such that the adhesive tip is placed against the pick;

wherein the pick is thus adhered to the adhesive tip;

wherein the pick can then be removed through the sound hole.

17. The semi-rigid retrieval device configured for use with a guitar according to claim 16 wherein in the flexible shaft is a reusable rubber twist tie.

18. The semi-rigid retrieval device configured for use with a guitar according to claim 17 wherein the elastic material is formed from the group consisting of latex or polyurethane.

19. A semi-rigid retrieval device comprising an adhesive tip, a flexible shaft, and a handle;

wherein the handle is attached to an end of the flexible shaft;

wherein the adhesive tip is attached to the end of the flexible shaft that is distal from the handle;

wherein the flexible shaft is a semi-rigid shaft;

wherein the flexible shaft does not behave in an elastic manner;

wherein the flexible shaft is bent into an arbitrary but stationary position;

wherein the arbitrary but stationary position is maintained until the flexible shaft is subsequently manipulated;

wherein the flexible shaft comprises a wire core and a flexible covering;

wherein the flexible covering encloses the wire core;

wherein the flexible shaft is further defined with a first end and a second end;

wherein the flexible shaft is a cylindrical structure that is further defined with an outer diameter;

wherein the wire core is a metal wire;

wherein the wire core is formed in a semi-rigid but non-elastic fashion such that the wire core can be bent into an arbitrary position that will be maintained until the wire core is subsequently adjusted;

wherein the flexible covering is formed from an elastic material;

wherein the handle is a capped tube;

wherein the capped tube is further defined with an open end and a capped end;

wherein the open end forms a cylindrical aperture that is further defined with an inner diameter;

wherein the open end of the capped tube is an aperture that provides access to the interior of the capped tube;

wherein the adhesive tip is an adhesive structure that attaches to the flexible shaft;

wherein the adhesive tip is formed with a removable adhesive;

wherein the adhesive tip comprises a reusable adhesive putty;

wherein the reusable adhesive putty has a malleable consistency;

wherein the adhesive tip self-adheres to the flexible shaft;

wherein the outer diameter of the second end of the flexible shaft is lesser than the inner diameter of the open end of the capped tube;

wherein the adhesive tip attaches to the first end of the flexible shaft;

wherein the second end of the flexible shaft is inserted into the open end of the capped tube.

* * * * *